(12) United States Patent
Dropps

(10) Patent No.: US 8,553,696 B1
(45) Date of Patent: Oct. 8, 2013

(54) METHOD AND SYSTEM FOR PROCESSING A NETWORK PACKET

(75) Inventor: Frank R. Dropps, Maple Grove, MN (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/039,221

(22) Filed: Mar. 2, 2011

Related U.S. Application Data

(63) Continuation of application No. 12/016,042, filed on Jan. 17, 2008, now Pat. No. 7,983,265.

(51) Int. Cl.
*H04L 12/26* (2006.01)
*H04L 12/66* (2006.01)

(52) U.S. Cl.
USPC ............................ 370/392; 370/409; 370/463

(58) Field of Classification Search
USPC ................. 370/252, 389, 390, 392, 400, 401, 370/409, 419, 420, 463
See application file for complete search history.

(56) References Cited

U.S. PATENT DOCUMENTS 7,362,764 B2 * 4/2008 Johnsen et al. .......... 370/395.21
7,733,855 B1 * 6/2010 Torudbaken et al. ......... 370/389

* cited by examiner

*Primary Examiner* — Kerri Rose
(74) *Attorney, Agent, or Firm* — Blakely, Sokoloff, Taylor & Zafman LLP

(57) ABSTRACT

Method for and system validating a network packet is provided. The method includes receiving a network packet at a port of a network device, the packet including a first indicia value and a second indicia value; comparing the first indicia value of the packet with at least a first value stored at the network device; comparing the second indicia value of the packet with at least a second value stored at the network device; and processing the packet if the first indicia value matches with the first value and the second indicia value matches with the second value; wherein the first indicia value is a partition key that restricts communication between a packet source and at least one destination; and the second indicia value is one or more of a source address and a destination address, where a same physical port of a source is assigned more than one source address.

16 Claims, 8 Drawing Sheets

| PORT | SOURCE ADDRESS | DESTINATION ADDRESS |
|---|---|---|
| 408A | S1 | |
| 408A | S2 | |
| 408A | S3 | |
| 436 | | D1 |
| 410A | | D2 |
| 438 | | D3 |
| 412A | | D4 |

| PARTITION KEY | SOURCE ADDRESS | DESTINATION ADDRESS |
|---|---|---|
| P1 | S1 | D1 |
| P1 | S1 | D2 |
| P2 | S2 | D2 |
| P2 | S2 | D3 |
| P3 | S3 | D1 |
| P3 | S3 | D3 |

| PARTITION KEY | SOURCE ADDRESS |
|---|---|
| P1 | S1 |
| P2 | S2 |
| P3 | S3 |
| .. | .. |
| .. | .. |
| .. | .. |

METHOD AND SYSTEM FOR PROCESSING A NETWORK PACKET

The present patent application is a Continuation application claiming priority from application Ser. No. 12/016,042, filed Jan. 17, 2008, issued as U.S. Pat. No. 7,983,265.

TECHNICAL FIELD

The present disclosure relates to networks, and more particularly, to processing network packets.

RELATED ART

Network systems are commonly used to move network information (may also be referred to interchangeably, as frames, packets or commands) between computing systems (for example, servers) or between computing systems and network devices (for example, storage systems). Various hardware and software components are used to implement network communication, including network switches.

Various standards and protocols are used for network communication. InfiniBand (IB) is one such standard protocol IB switches are typically used to route IB packets. The IB standard has been expanded to allow use of multiple addresses for the same device. This is useful for virtualization operations. The use of multiple addresses however, may result in security problems.

The IB standard specifies the use of partition keys to control access to devices. Typically, devices within a partition are authorized to communicate with each other. Typically, the partitions are set up by a subnet manager (SM) using a computing system. Partition keys are validated before devices can communicate. However, simply validating the partition key does not take into account that a same device port may have multiple addresses (for example, virtual port addresses). Hence, this may result in unauthorized access, resulting in a security breach. Therefore, there is a need for improving security in IB based networks and the methodology for handling partition keys in an environment where a physical port may have multiple addresses.

SUMMARY

In one embodiment, a method for validating a network packet is provided. The method includes receiving a network packet at a port of a network device, the packet including a first indicia value and a second indicia value; comparing the first indicia value of the packet with at least a first value stored at the network device; comparing the second indicia value of the packet with at least a second value stored at the network device; and processing the packet if the first indicia value matches with the first value and the second indicia value matches with the second value; wherein the first indicia value is a partition key that restricts communication between a packet source and at least one destination; and the second indicia value is one or more of a source address and a destination address, where a same physical port of a source is assigned more than one source address.

In another embodiment, a network device is provided. The network device includes a port for receiving a packet with a first indicia value and a second indicia value; and a validation module that stores a first value and a second value for validating the packet, the validation module includes logic for comparing the first indicia value with the first value and the second indicia value with the second value; wherein the first indicia value is a partition key that restricts communication between a packet source and at least one destination port; and the second indicia value is one or more of a source address and a destination address, where a same physical port is assigned more than one source address.

In yet another embodiment, a validation module for a network device for validating a network packet received by the network device is provided. The validation module includes a storage module that stores a first value and a second value for validating the packet; and logic for comparing a first indicia value with the first value and a second indicia value with the second value; wherein the first indicia value is a partition key that restricts communication between a packet source and at least one destination port; and the second indicia value is one or more of a source address and a destination address, where a same physical port is assigned more than one source address.

This brief summary has been provided so that the nature of the disclosure may be understood quickly. A more complete understanding of the disclosure can be obtained by reference to the following detailed description of the various embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures:

FIGS. 4B and 4C show tables used for routing packets, according to one embodiment;

FIG. 6A shows a storage module for use with an embodiment of a validation module;

DETAILED DESCRIPTION

Definitions

Figure 1A:
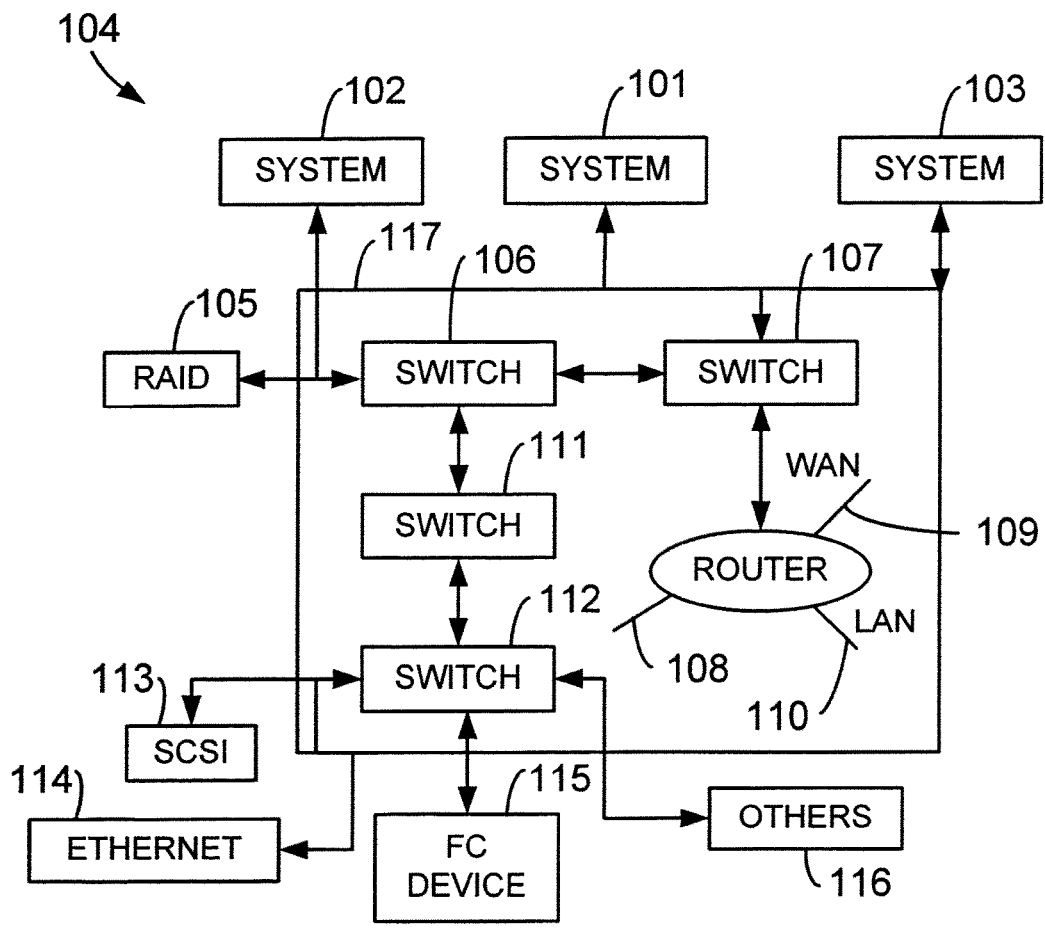
FIG. 1A shows a block diagram of a network system, according to one embodiment.

The following definitions are provided for convenience as they are typically (but not exclusively) used in IB network systems and in general networking environment, implementing the various adaptive aspects described herein.

"DLID" means a destination identifier, a field in an IB packet for identifying a local subnet packet destination.

"Packet" means a group of one or more network data word(s) for network communication.

"Partition Key" means a value typically included in network packet headers and is used to determine membership in a partition.

"Partition Key Table" means a table of Partition Keys.

"Partition Manager" means an entity that manages partition keys and membership.

"Routing Table" means a table that stores information for routing a packet.

"Service Level" (SL) as defined by the IB Specification means a value in a standard Local Route Header per the IB Standard that is used to identify a Virtual Lane for a packet. Each IB packet has a SL value, which is specified in a standard packet header.

"SLID" means a source identifier in an IB packet for identifying a local subnet packet source.

"Switch" means a networked device that facilities network communication conforming to certain protocols/standards, for example, the IB protocol.

"Virtual Lane" (VL): VL is defined by Section 3.5.7 of the IB Specification and provides a mechanism for creating virtual links within a single physical link. A virtual lane represents a set of transmit and receive buffers in a port.

To facilitate an understanding of the various embodiments, the general architecture and operation of a network system will be described. The specific architecture and operation of the various embodiments will then be described with reference to the general architecture of the network system.

IB is a switched fabric interconnect standard for servers, incorporated herein by reference in its entirety. IB technology is deployed for server clusters/enterprise data centers ranging from two to thousands of nodes. The IB standard is published by the InfiniBand Trade Association.

An IB switch is typically a multi-port device. Physical links (optical or copper) connect each port in a switch to another IB switch or an end device (for example, ports of a Target Channel Adapter (TCA) or a Host Channel Adapter (HCA). The end devices are conventionally known as endpoints. The endpoints may be a source endpoint, which sends a packet; or a destination endpoint, which receives a packet. The endpoints may also be both source endpoints and destination endpoints depending upon whether they are sending or receiving a packet.

In IB based communication, partitions are typically used to limit access to devices. A partition typically includes a collection of endpoint ports that are allowed to communicate with each other. Endpoint ports may be members of multiple partitions simultaneously. A partition key is typically used to identify whether a network device is permitted to communicate within a partition. Partition key values are typically included in IB packets and stored in endpoint adapters (for example, TCA and HCA) to determine membership in a given partition. Each port of a switch or router connected to endpoint adapters maintains a partition key table. A subnet manager (SM) through a partition manager (PM) typically manages partition keys and membership to a given partition.

Typically, when a switch or router port receives a packet, the port verifies the partition key embedded in the packet with partition key information stored in a partition table, before granting access. If the partition key in the packet does not match with the stored partition key information, the packet is discarded.

In conventional systems, the partition key has no correlation with multiple local address identifiers (LIDs) that may be used for the same device, for example, multiple local addresses for an endpoint. This can result in undetected partition key violations. The adaptive embodiments disclosed herein address this problem.

FIG. 1A shows a block diagram of a network system 104. System 104 includes a switching fabric 117, which includes plural network switches 106, 107, 111 and 112 for moving network packets. Fabric 117 also includes a router 108 that is coupled to a wide area network 109 and local area network 110.

Switch 106 is operationally coupled to storage system 105 (for example, a RAID (redundant array of inexpensive disks) system) and to system 102, while system 101 and 103 may be operationally coupled to switch 107.

Switch 112 may be coupled to a small computer system interface ("SCSI") SCSI port 113 that is coupled to SCSI based devices (not shown). Switch 112 may also be coupled to an Ethernet port 114, Fibre Channel device (s) 115 and other device(s) 116.

Systems 101-103 may be computing systems that typically include several functional components. These components may include a central processing unit (CPU), main memory, input/output ("I/O") devices, and streaming storage devices (for example, tape drives). In typical computing systems 101-103, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system or host computing system.

Figure 1B:
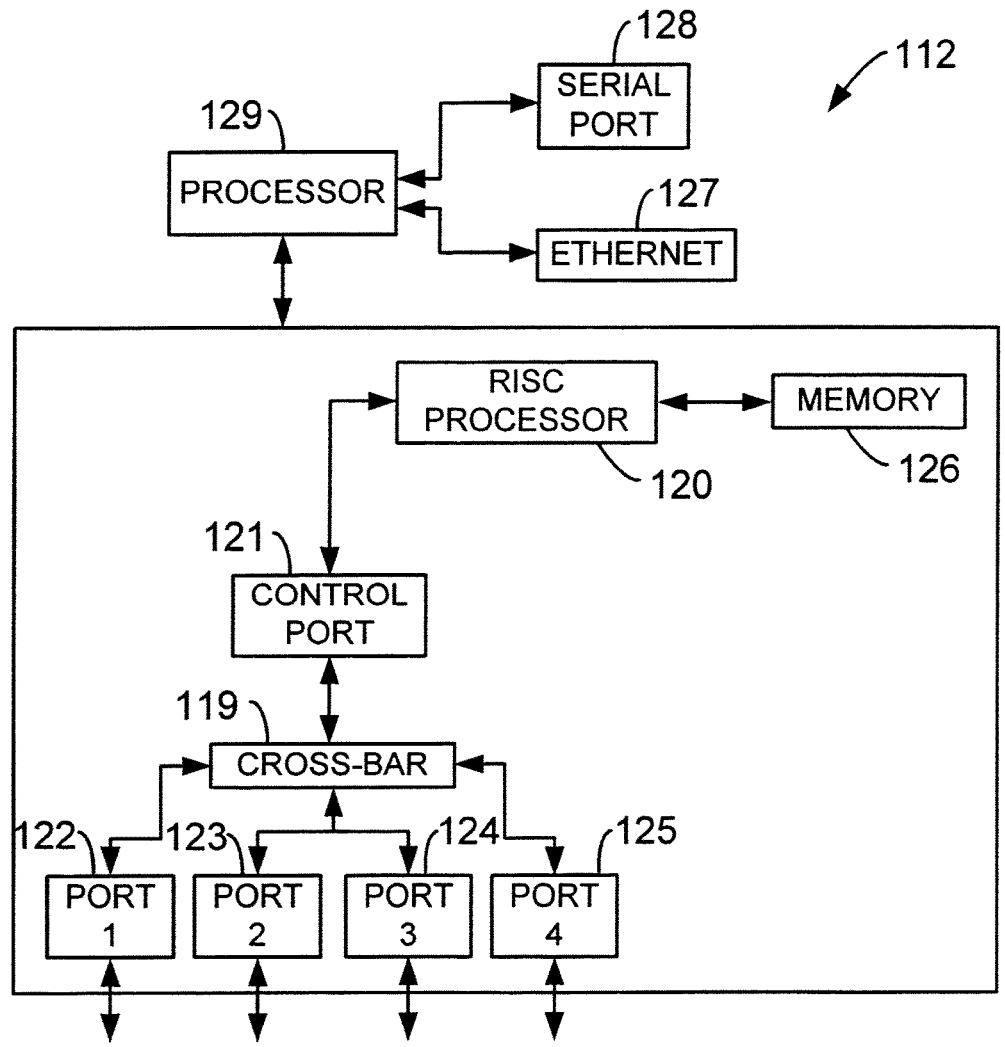
FIG. 1B shows a block diagram of a switch in a network system, according to one embodiment.

FIG. 1B shows a block diagram of switch 112 that includes a processor 120, which is operationally coupled to plural ports 122, 123, 124 and 125 via a control port 121, and crossbar 119. In one embodiment, processor 120 may be a reduced instruction set computer (RISC) type microprocessor. Processor 120 controls the overall switch 112 operations by executing firmware instructions stored in memory 126.

Switch 112 may be coupled to an external processor 129 that is coupled to an Ethernet port 127 and serial port 128. In one embodiment, processor 129 may be a part of a computing system (for example, 101-103). An administrator may use processor 129 to configure switch 112.

Figure 2A:
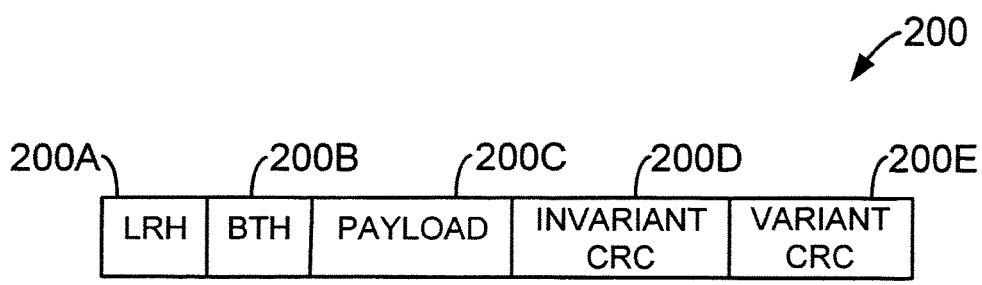
FIG. 2A shows a block diagram of a network packet structure used according to one embodiment.

FIG. 2A provides an example of packet structure that may be used in the various embodiments described herein. Packet 200 includes a local route header 200A, a base transport header (BTH) 200B, packet payload 200C, invariant cyclic redundancy code (CRC) 200D, and variant CRC 200E. Packet structure 200 is described in Infiniband Architecture Specification, Volume 1, Chapter 6, titled "Data Packet Format", incorporated herein by reference in its entirety.

Figure 2B:
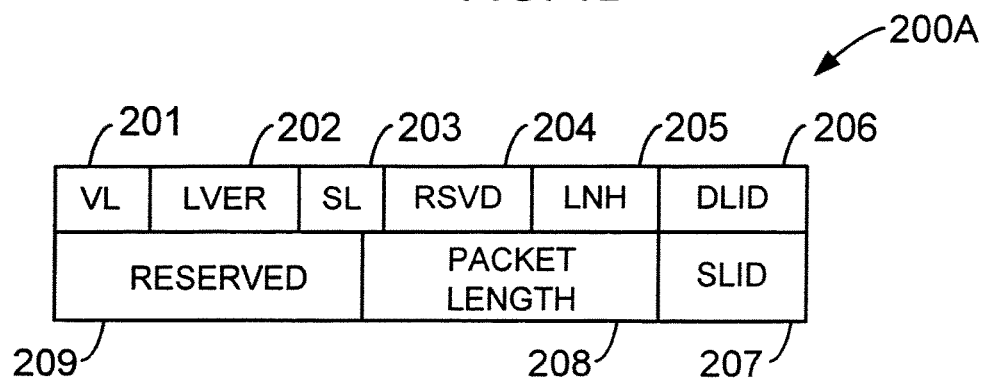
FIG. 2B shows a block diagram of LRH field of a network packet structure used according to one embodiment.

FIG. 2B shows a block diagram of a local route header (LRH) 200A, with plural fields for routing packets within the same subnet. The fields may be used for routing network packets in an IB based network environment. LRH 200A includes a virtual lane (VL) field 201 that identifies which receive buffer and flow control credits should be used for processing a received packet, and link version (Lver) field 202 specifies the version of the LRH packet 200A. LRH 200A also includes service level (SL) field 203, a standard field that is used identify a VL for a packet.

LRH 200 further includes a Link next header (LNH) field 205, which specifies what header follows LRH 200A. Fields 204 and 209 are reserved fields.

LRH 200A also includes a DLID field 206 that specifies the local destination to which switch 112 delivers the packet and SLID field 207 that indicates the local source of a network packet. Packet length field 208 specifies the number of words contained in a packet.

Figure 2C:
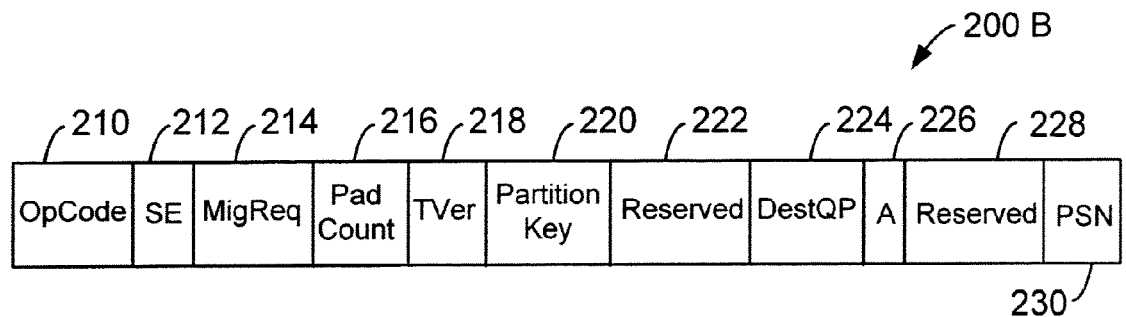
FIG. 2C shows a block diagram of BTH field of a network packet structure used according to one embodiment.

FIG. 2C shows a block diagram of a base transport header (BTH) 200B field of a packet, with plural fields. The BTH 200B field includes OpCode 210, Solicited Event (SE) 212, MigReq 214, Pad Count 216, Transport Header Version (Tver) 218, Partition Key 220, Destination QP (DestQP) 224, Acknowledge Request 226, packet sequence number (PSN) 230 and two Reserved fields 222 and 228. The Partition Key 220 indicates which logical partition is associated with a packet. The DestQP 224 field indicates the work queue pair (QP) number at the destination. The PSN 230 field is used to detect a missing or duplicate packet.

Figure 3:
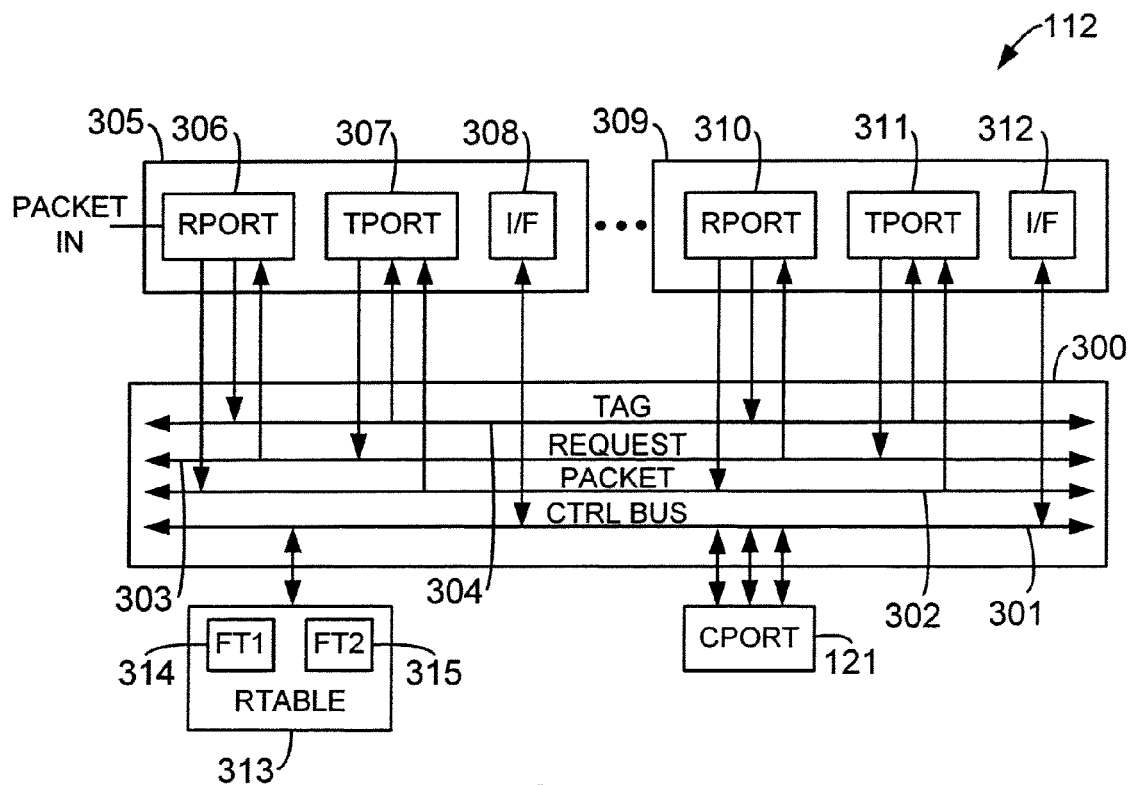
FIG. 3 shows another block diagram of a switch according to one embodiment.

FIG. 3 shows another block diagram of a switch 112 (or switch element 112) with a switch fabric 300, used according to one embodiment. Switch fabric 300 is operationally coupled to CPORT 121 and plural ports 305 and 309. It is noteworthy that ports 305 and 309 are similar to ports 122-125.

Switch fabric 300 includes a packet data crossbar 302, packet request crossbar 303 and packet tag crossbar 304 and a control bus 301. Packet data crossbar 302 connects receive ports (306, 310) and transmit ports (307,311), and can concurrently transmit plural packets. Packet Tag crossbar 304 is used to move plural packet tags from receive ports (306, 310) to transmit ports (307, 311), as described below. Packet request crossbar 303 is used by transmit port (307, 311) to request a particular packet from a receive buffer.

Routing table (RTABLE) 313 is used to map DLID 206 from a LRH 200A to one or more output ports. Routing table 313 includes forwarding tables 314 and 315, which are look up tables (LUTs) that service ports 305 and 309, respectively.

Interface (I/F) 308 and 312 provide input/output interface to switch 112.

Switch 112 may be implemented as a switch element of a single CMOS ASIC (application specific integrated circuit), and for this reason the term "switch", "switch element" and ASIC are used interchangeably to refer to the various embodiments in this specification.

For illustration purposes only, in FIG. 3, all ports coupled to end devices are on one side of ASIC 112. However, the ports may be located on any side of ASIC 100. This does not imply any difference in port or ASIC design. Actual physical layout of the ports depends on the physical layout of the ASIC.

Figure 4A:
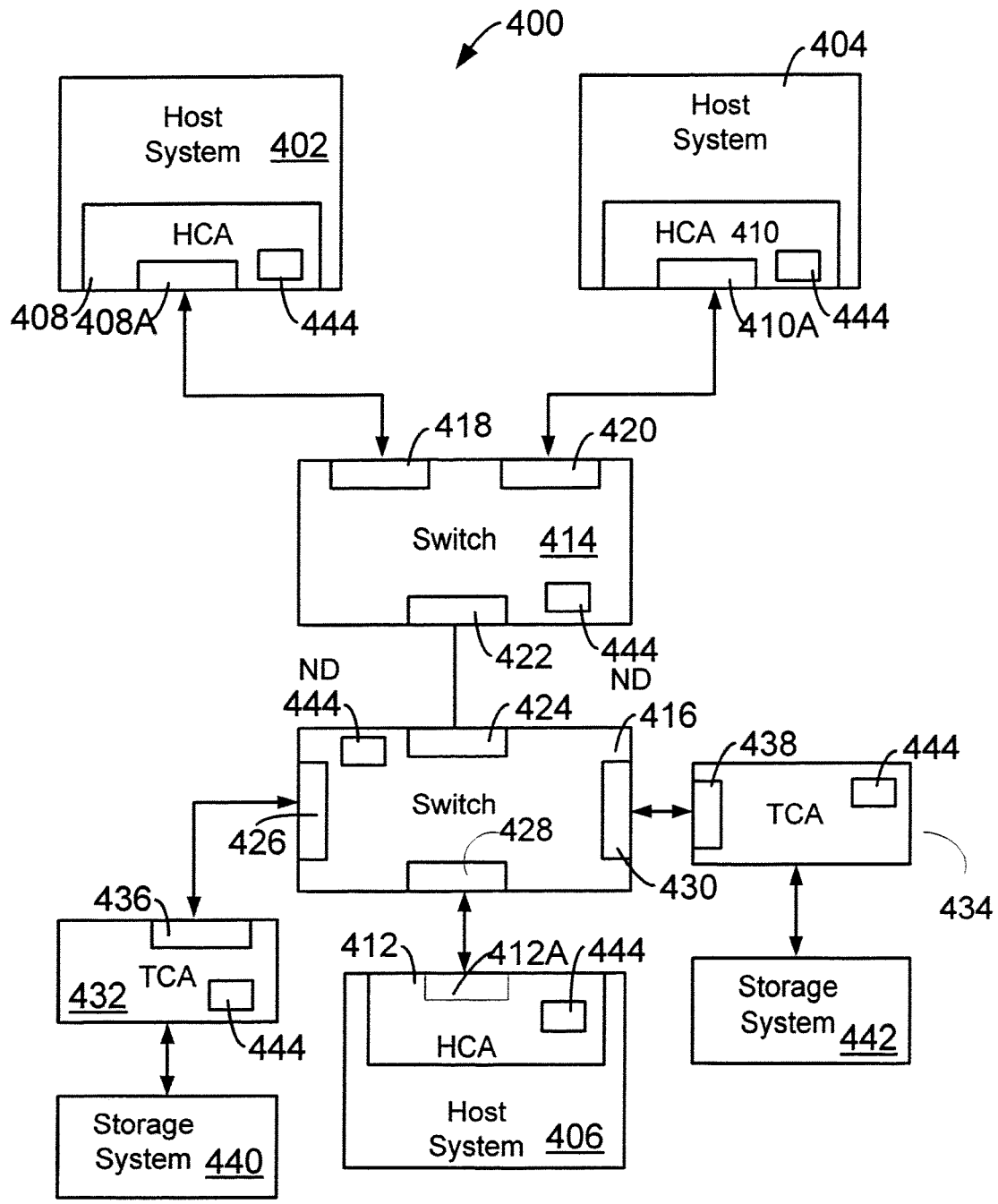
FIG. 4A shows a network system block diagram with a validation module of the current disclosure.

FIG. 4A shows block diagram of a network system 400 using the embodiments of the present disclosure. The network system may include plural host systems 402, 404 and 406. Host systems 402, 404 and 406 may include one or more HCAs, for example, HCA 408, HCA 410 and HCA 412, respectively. Each HCA includes one or more ports. For example, HCA 408 includes port 408A, HCA 410 includes port 410A and HCA 412 includes port 412A.

The network system further includes one or more network adapters, for example, switches 414 and 416. Each switch may further include one or more ports, for example, switch 414 includes ports 418, 420 and 422. Switch 416 includes ports 424, 426, 428 and 430.

The network system further includes one or more TCA, for example, TCAs 432 and 434. The TCAs may include one or more ports. For example, TCA 432 includes port 436 and TCA 434 includes port 438.

TCAs may be operatively connected to peripheral systems, for example, storage systems. TCA 432 is operatively connected to a storage system 440 and TCA 434 is operatively connected to storage system 442.

The ports in network system 400 are configured to communicate with each other. For example, port 408A of HCA 408 communicates with port 418 of switch 414. Similarly, port 410A of HCA 410 communicates with port 420 of switch 414. Port 422 of switch 414 communicates with port 424 of switch 416. Port 426 of switch 416 communicates with port 436 of TCA 432, port 428 of switch 416 communicates with port 412A of HCA 412 and port 430 of switch 416 communicates with port 438 of TCA 434.

A network packet originating from a host system for delivery to a destination may be routed through one or more switches. For example, a network packet originating from host system 402 for delivery to a destination, for example, storage system 440 may be sent through port 408A of HCA 408 to port 418 of switch 414. Switch 414 may forward the network packet via port 422 to port 424 of switch 416. Switch 416 in turn may forward the network packet via port 426 to port 436 of TCA 432. TCA 432 then forwards the network packet to storage system 440.

According to an embodiment of this disclosure, a validation module may be used to validate a network packet at port before the network packet is processed for further transmission. For example, a validation module 444 may be implemented in a host channel adapter, switch or a target channel adapter. Further details of an exemplary validation module 444 are described below with reference to FIG. 5.

Now referring to FIG. 4B, exemplary assignment of source address and destination address for each port of the network system of FIG. 4 is shown. For example, port 408A of HCA 408 may be identified by one or more source addresses. Referring to rows 450, 452 and 454, port 408A may be identified by a source address S1, S2 and S3.

Port 436 of TCA 432 may be identified by a destination address. For example, in row 456, port 436 is identified by destination address D1. Similarly, in rows 458, 460 and 462, port 410A is identified by destination address D2, port 438 is identified by destination address D3 and port 412A is identified by destination address D4.

Although in this example, each destination port is identified by a single destination address, in one embodiment, multiple destination addresses may be assigned to the same physical port.

As one skilled in the art appreciates, in one embodiment, a port may have a transmit segment for transmitting a packet and a receive segment for receiving a packet. In one embodiment, the transmit segment of the port may be identified by one or more source address. In another embodiment, the receive segment of the port may be identified by one or more destination address. These source and destination addresses may be the same value and the packet direction (i.e. to the switch port from the switch port) may determine if a given device address is the source or destination address.

Now referring to FIG. 4C, the table shows permitted communication between a source identified by a source address and one or more destinations identified by a destination address and the corresponding partition key. For example, referring to rows 464 and 466, a network packet with a source address of S1 with a partition key of P1 can be transmitted to destinations with destination address D1 and D2. Similarly, referring to rows 468 and 470, a network packet with a source address of S2 with a partition key of P2 can be transmitted to destinations with destination address D2 and D3. Similarly, referring to rows 472 and 474, a network packet with a source address of S3 with partition key P3 can be transmitted to destinations with destination address D1 and D3.

Figure 5:
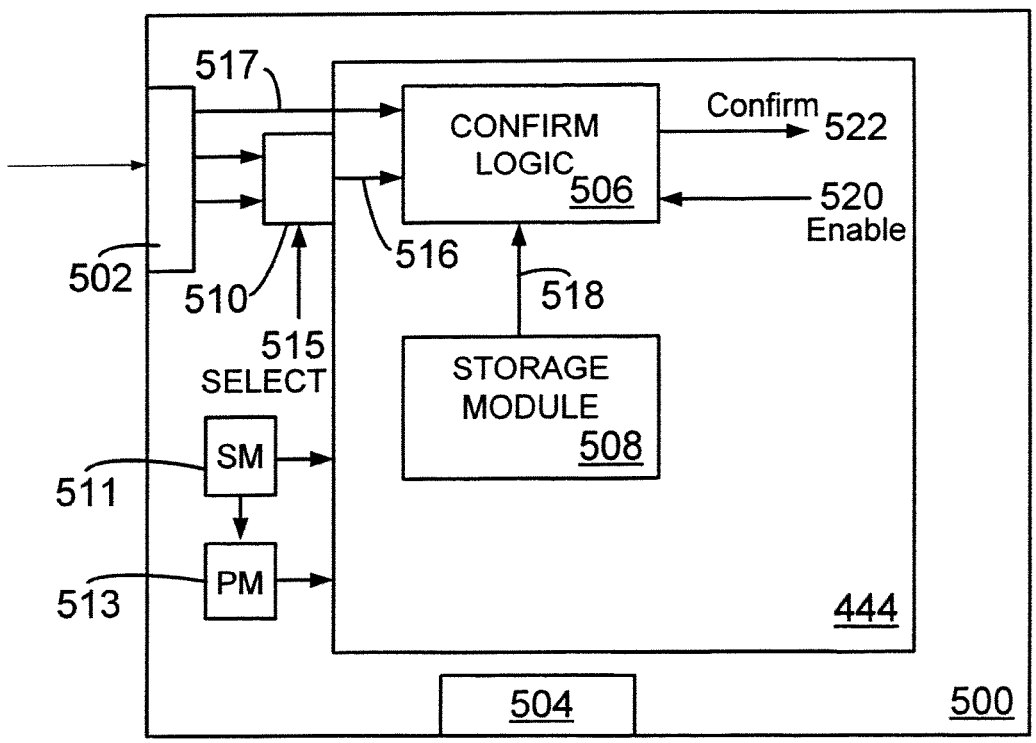
FIG. 5 shows a validation module, according to one embodiment.

FIG. 5 shows an exemplary validation module 444, according to an embodiment of this disclosure, to validate permitted transmission of a network packet. Validation module 444 may be implemented in a network device, for example, HCA, TCA, router and/or switch. As an example, the description of the validation module 444 below will be described with reference to a switch.

Referring to FIG. 5, the network device 500 includes a port 502 to receive a network packet, a port 504 to transmit a network packet and a validation module 444. The network packet includes a source address, destination address and a partition key. The validation module 444 includes a confirm logic 506, a storage module 508 and a select logic 510. The network device 500 further includes a subnet manager 511 and a partition manager 513. As one skilled in the art appreciates, the subnet manager 511 and partition manager 513 may be located in a different network device than the network device 500, so long as the subnet manager 511 and partition manager 513 can communicate with the network device 500.

The subnet manager 511 manages initialization and configuration of various network devices in a network system. As part of performing this function, the subnet manager 511 in conjunction with the partition manager 513 assigns source addresses, destination addresses and partition keys. According to an embodiment of this disclosure, the subnet manager 511 communicates the permitted combination of source address-partition key and destination address-partition key to the storage module 508. The storage module 508 stores the permitted combination of the source address-partition key and destination address-partition key.

The select logic 510 is configured to receive the source address and the destination address of a network packet from port 502, as inputs and selectively outputs one of the source address and the destination address based on a select signal 515.

Confirm logic 506 is configured to receive the output of the select logic 510 over a bus 516 and the partition key from the port 502 over bus 517. The confirm logic 506 is also configured to selectively receive permitted combination of source address-partition key and destination address-partition key from storage module 508 over bus 518. For example, if the output of select logic 510 is a source address, then confirm logic 506 receives the permitted combination of the source address-partition key information from storage module 508. In the alternative, if the output of select logic 510 is a destination address, then confirm logic 506 receives the permitted combination of the destination address-partition key information from storage module 508.

In one embodiment, an enable signal 520 selectively enables and disables confirm logic 506. For example, if enable signal 520 is asserted, confirm logic 506 validates source address-partition key or destination address-partition key validation as appropriate. If the enable signal 520 is not asserted, confirm logic 506 does not perform any validation, according to the embodiments disclosed herein. Instead, confirm logic 506 processes the network packet based upon the partition key only and forwards the network packet to all destinations, which share the same partition key.

If enable signal 520 is asserted, based upon the select signal 515, confirm logic 506 either compares the source address and the partition key of the network packet with the stored permitted combination of source address-partition key; or the destination address and the partition key of the network packet with the stored permitted combination of destination address-partition key. If there is a match, then confirm logic 506 indicates the match by asserting a confirm signal 522. The confirm signal 522 may be used by the network device 500 to further process the network packet for transmission to the destination. If there is no match, in one embodiment, the network device discards the network packet.

FIG. 6A shows an exemplary table 600 that may be implemented in a storage module 508 to store permitted source address-partition key combinations. Each row of the table 600 shows one permitted source address-partition key combination. For example, row 602 shows source address S1 with a partition key of P1 as a permitted source address-partition key combination. Similarly, row 604 shows source address S3 with a partition key of P3 as another permitted source address-partition key combination.

Figure 6B:
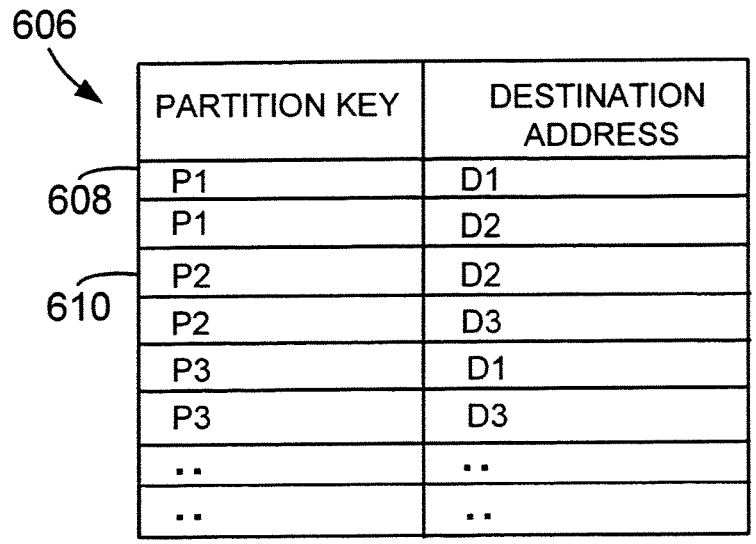
FIG. 6B shows a storage module for use with an embodiment of a validation module.

FIG. 6B shows an exemplary table 606 that may be implemented in a storage module 508 to store permitted destination address-partition key combinations. For example, row 608 shows destination address D1 with a partition key of P1 as a permitted destination address-partition key combination. Similarly, row 610 shows destination address D2 with a partition key of P2 as a permitted destination address-partition key combination.

Although two separate tables have been described to store the source address-partition key and destination address-partition key combinations, as one skilled in the art appreciates, alternate table arrangements may be constructed to store all the permitted source address-partition key and destination address-partition key combinations in a single table. In one embodiment, the storage module 508 may be configured as a content addressable memory (CAM).

Figure 7:
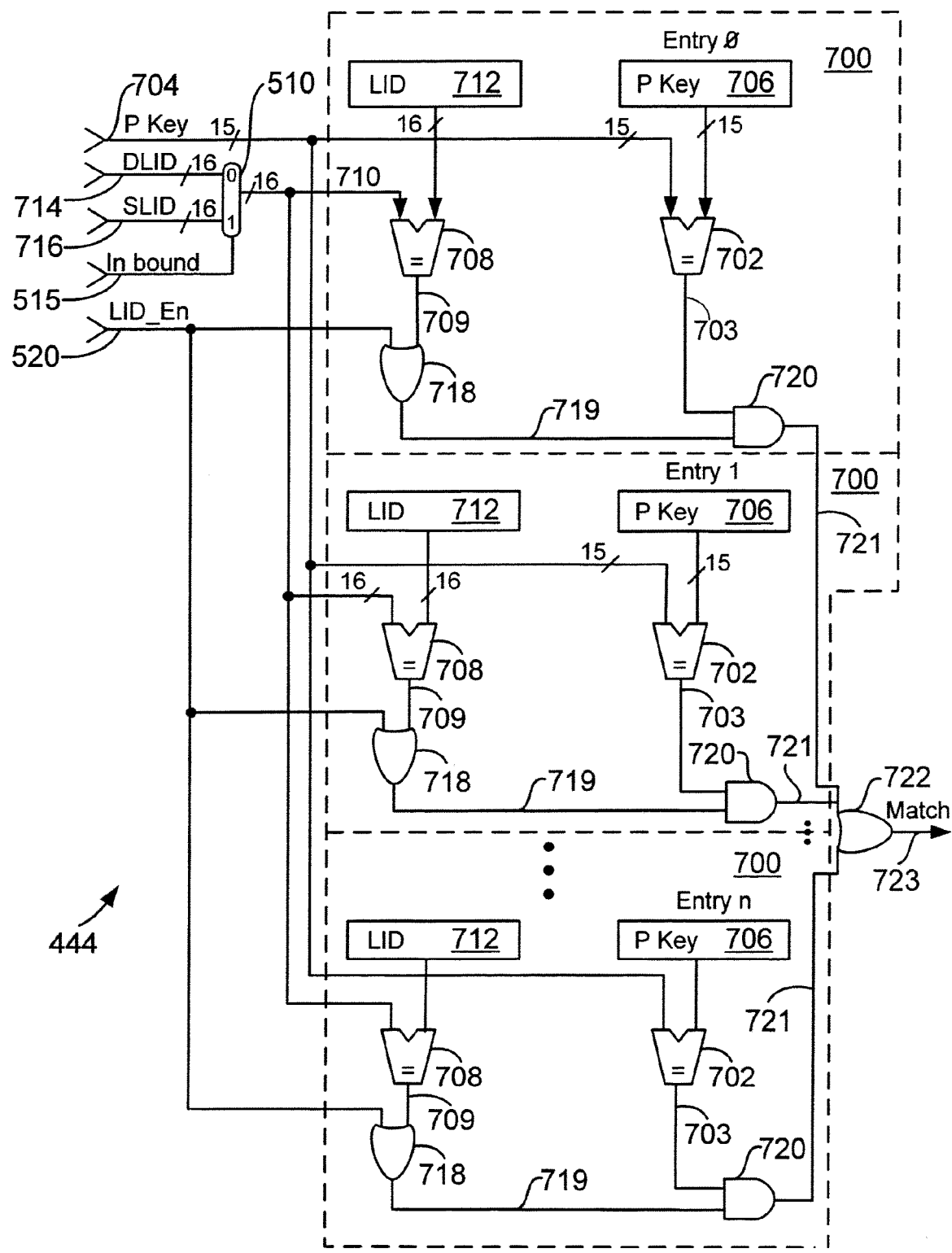
FIG. 7 shows a logic diagram of a validation module, according to one embodiment.

FIG. 7 shows an example of validation module 444 logic with confirm logic 506, according to one embodiment of the present disclosure. Confirm logic 506 may include a plurality of sub-compare logic 700 (also referred to as logic 700) for simultaneously validating network packets. Instead of simply checking the partition key (as performed by conventional systems), confirm logic 506 also verifies the address to ensure that a port with more than one address is authorized to communicate with a particular port and is authorized to use the partition key contained within the data packet.

Each sub-compare logic 700 may include a first compare logic 702 and a second compare logic 708. The first compare logic 702 compares a first indicia value 704 with a first value 706. The second compare logic 708 may compare a second indicia value 710 with a second value 712. The first value 706 and second value 712 may be stored in a content addressable memory (CAM).

In one embodiment, the first value 706 may include a permitted partition key. The first indicia value 704 is a partition key of a network packet that is received by a network device port.

Compare logic 702 compares the partition key (704) with stored partition keys 706. Based on the comparison, an output 703 is generated and sent to logic 720.

The second value 712 may be stored as local identifiers (LIDs). The LIDs may include different source/destination address for the same port. The second indicia value 710 may be the source address 714 or the destination address 716, which are selected by select logic 510.

Select logic 510 receives the source address 716 and the destination address 714 as inputs. Based on select signal 515, either the source address 714 or the destination address 716 is output as the second indicia value 710. This selection is based on a packet's direction into or out of the switch. The LID value is compared to the packet's source LID (SLID) 207 on ingress ports and the destination LID (DLID) 206 on egress ports.

Compare logic 708 compares the source or destination address (714 or 716) with stored value 712 and generates an output 709 that is sent to logic 718. Logic 718 is enabled by enable signal 520. If the enable signal 520 is asserted, output 719 from logic 718 is sent as an input to logic 720.

When both inputs (719 and 703) to logic 720 are asserted, the output of logic 720 is asserted. If the enable signal 520 is asserted and the output of the logic 720 is asserted, it indicates a match at both the first compare logic 702 and the second compare logic 708.

In one embodiment, each sub-compare logic 700 simultaneously compares the first and second indicia values with the first and second values, respectively. Output 721 from logic 720 for each sub-compare logic 700 is input to OR-logic 722. If any one of output 721 is asserted, then OR-logic 722 output 723 (similar to confirm signal 522) indicates a match.

Figure 8:
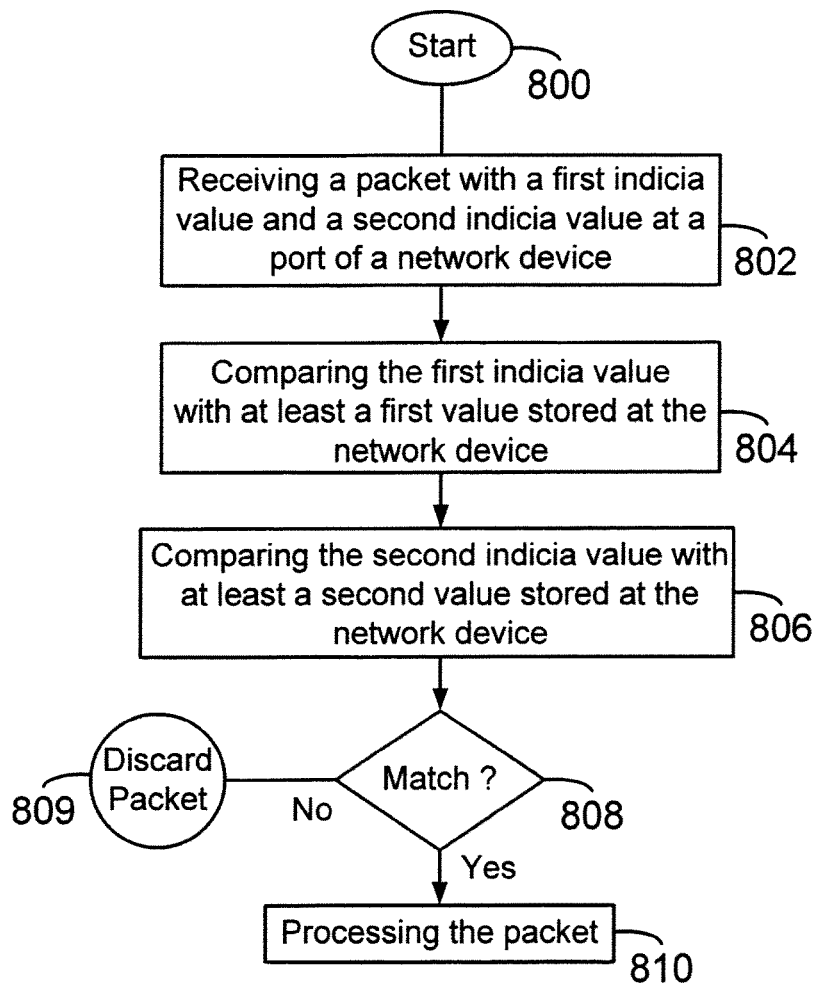
FIG. 8 shows a process flow diagram for validating a network packet according to an embodiment.

Now referring to FIG. 8, the method for validating a network packet, according to an embodiment of this disclosure will be described. The process starts in step 800 when a network device is operational (i.e. can receive and transmit packets).

In step 802, the network device receives a network packet, the packet including a first indicia value and second indicia value. The network packet is received from a source, for transmission to a destination. The first indicia value may be a partition key that restricts communication between a packet source and at least one destination. The second indicia value is a one or more of a source/destination address, where a same physical port of a source may be assigned more than one source address. A select signal (520, FIG. 5) may be used to select either the source address or destination address.

In step 804, the first indicia value is compared with at least a first value stored at the network device. For example, the first stored value may be the partition key stored in a storage module of a network device.

In step 806, the second indicia value is compared with at least a second value stored in the network device. For example, in one embodiment, the second value may be a source address of a permitted source address-partition key combination. In another embodiment the second value may be a destination address of a permitted destination address-partition key combination. In one embodiment, the second value may be stored in a storage module of the network device.

It is noteworthy that the comparison in steps 804 and 806 may be selectively enabled by a signal (for example, signal 520, FIG. 5).

In step 808, the process determines if the first indicia value matches with the first value and the second indicia value matches with the second value. If there is no match, then the packet is discarded. If there is a match, then in step 810, the network packet is processed for reception or transmission.

In one embodiment, the system and methods described above enhance security in IB networks. Not only partition keys are verified for each packet, the local address identifiers are also verified to ensure that partition keys and multiple addresses for each port are verified. This strengthens the partition key enforcement preventing unauthorized access to data while allowing multiply routing paths and virtualization with the use of multiple local device addresses Although the present disclosure has been described with reference to specific embodiments, these embodiments are illustrative only and not limiting. Many other applications and embodiments of the present disclosure will be apparent in light of this disclosure and the following claims.

What is claimed is:

1. A method for validating a network packet, comprising:
   receiving a network packet at a port of a network device, the packet including a first indicia value and a second indicia value;
   comparing the first indicia value of the packet with at least a first value stored at the network device;
   comparing the second indicia value of the packet with at least a second value stored at the network device, wherein the comparison of the second indicia value of the packet is selectively enabled and disabled; and
   processing the packet if the first indicia value matches with the first value and the second indicia value matches with the second value; wherein the first indicia value is a partition key that restricts communication between a packet source and at least one destination; and
   the second indicia value is one or more of a source address and a destination address, where a same physical port of a source is assigned more than one source address.

2. The method for validating of claim 1 further comprising:
   selecting one of the source address and the destination address as the second indicia value.

3. The method of claim 1, wherein the network packet is an InfiniBand packet.

4. The method of claim 1, wherein the network device is one or more of a target channel adapter, a host channel adapter and a network device.

5. The method of claim 1, wherein the network device stores the first value and the second value at a content addressable memory.

6. A network device, comprising:
   a port for receiving a packet with a first indicia value and a second indicia value; and
   a validation module that stores a first value and a second value for validating the packet, where the validation module includes logic for comparing the first indicia value with the first value and the second indicia value with the second value and receiving an enable signal to selectively enable and disable the comparison of the second indicia value with the second value; wherein the first indicia value is a partition key that restricts communication between a packet source and at least one destination port; and the second indicia value is one or more of a source address and a destination address, where a same physical port is assigned more than one source address.

7. The network device of claim 6, further including a storage module to store the first value and the second value.

8. The network device of claim 6, wherein the validation logic is configured to receive a select signal to select one of the source address and the destination address as the second indicia value for comparison.

9. The network device of claim 6, wherein the network device is a switch and the switch processes the packet for transmission to the destination if the second value matches with the second indicia value, wherein the second indicia value is the source address.

10. The network device of claim 6, wherein the network device is one or more of a switch, a host bus adapter and a target channel adapter.

11. The network device of claim 6, wherein the network packet is an InfiniBand packet.

12. The network device of claim 6 wherein the validation module includes an enable logic that selectively enables the comparison of the second indicia value with the second value.

13. A validation module in a network device for validating a network device, comprising:
   a storage module that stores a first value and a second value for validating the packet; and
   logic for comparing a first indicia value with the first value and a second indicia value with the second value and receiving an enable signal to selectively enable and disable the comparison of the second indicia value with the second value; wherein the first indicia value is a partition key that restricts communication between a packet source and at least one destination port; and the second indicia value is one or more of a source address and a destination address, where a same physical port is assigned more than one source address.

14. The validation module of claim 13, wherein the validation logic is configured to receive a select signal to select one of the source address and the destination address as the second indicia value for comparison.

15. The validation module of claim 14, wherein the network packet is an InfiniBand packet.

16. The validation module of claim 14, wherein the network device is one or more of a network switch, a host bus adapter and a target channel adapter.

* * * * *